United States Patent [19]

Bergles

[11] 4,403,977
[45] Sep. 13, 1983

[54] BICYCLE CHAIN-SHIFTING DEVICE

[75] Inventor: Eduard Bergles, Graz, Austria

[73] Assignee: Fichtel & Sachs AG, Schweinfurt, Fed. Rep. of Germany

[21] Appl. No.: 249,837

[22] Filed: Apr. 1, 1981

[30] Foreign Application Priority Data

Apr. 10, 1980 [DE] Fed. Rep. of Germany ....... 3013771

[51] Int. Cl.³ .............................................. F16H 11/00
[52] U.S. Cl. ....................................... 474/80; 74/470;
74/475; 267/150
[58] Field of Search ....................... 474/80, 82; 74/470,
74/475, 471, 526, 527, 529, 459; 267/150

[56] References Cited

U.S. PATENT DOCUMENTS

| 3,362,238 | 1/1968 | Hayashi et al. | 474/82 |
| 3,481,217 | 12/1969 | Maeda | 74/489 |
| 4,232,564 | 11/1980 | Yamasaki | 74/475 |
| 4,267,744 | 5/1981 | Yamasaki | 474/82 |
| 4,349,342 | 9/1982 | Schwerdhöfer | 474/80 |

FOREIGN PATENT DOCUMENTS

| 2834266 | 8/1978 | Fed. Rep. of Germany | |
| 2817627 | 11/1978 | Fed. Rep. of Germany | 74/475 |
| 789543 | 5/1935 | France | 74/470 |
| 206505 | 8/1939 | Switzerland | 74/470 |
| 219772 | 6/1942 | Switzerland | 74/470 |

Primary Examiner—Lawrence J. Staab
Assistant Examiner—Andrew Joseph Rudy
Attorney, Agent, or Firm—Toren, McGeady and Stanger

[57] ABSTRACT

In a chain-shifting device for a bicycle or the like a switch unit is to be attached to the bicycle frame. The switch unit comprises a switch frame, a switch member and an operating member. Both the switch member and the operating member are swingable about a swinging axis with respect to the switch frame. Transmission means extend between the operating member and a movable chain mover unit. In view of facilitating the shifting of the chain between different sprockets associated thereto it is desired to temporarily move the chain mover unit beyond the desired position adjusted to the respective sprocket and to return it hereupon into said desired position. For automatically obtaining such go and back movement of the chain mover unit when being brought to a desired position corresponding to a respective sprocket it is proposed that releasable locking means are operationally provided between the switch member and the switch frame, said releasable locking means being releasable by a releasing torque acting onto said switch member; abutment means are provided in part on said operating member and in part on said switch member for defining two angularly offset terminal positions of said operating member with respect to said switch member. The operating member is biased by a biasing torque towards a rest position with respect to said switch member; said biasing torque resists against deflection of said operating member from said rest position towards at least one of said terminal positions. The biasing torque is smaller than the releasing torque.

9 Claims, 6 Drawing Figures

BICYCLE CHAIN-SHIFTING DEVICE

SUMMARY OF THE INVENTION

The present invention is directed to a chain-shifting device for a bicycle or the like. The chain-shifting device comprises a switch unit. This switch unit includes a switch frame to be attached to a part of the bicycle frame and an operating member swingingly mounted on said switch frame about a swinging axis. The operating member is adjustable into a plurality of predetermined angular operating member positions about said swinging axis with respect to said switch frame. The operating member positions are defined by releasable locking means.

A chain mover support member is to be attached to the bicycle frame. A chain mover unit is movably mounted on said chain mover support member by guiding means guiding said chain mover unit along a path of movement with respect to said chain mover support member. First spring means are provided for biasing said chain mover unit towards one end of said path of movement. Transmission means extend between said operating member and said chain mover unit. The transmission means include a pulling member, e.g. a Bowden wire. The chain mover unit is movable by the operating member via said transmission means and against the action of said first spring means into a plurality of chain shift positions to said plurality of operating member positions. By chain shift positions are understood those positions of the chain mover unit in which the chain mover unit is in a common plane with the respective sprocket, so that the chain is applied to the respective sprocket.

Such chain shifting device is known from German Offenlegungsschrift 28 34 266.

The main object of the present invention is to provide a chain-shifting device in which on movement of the operating member to a predetermined operating member position the chain mover unit is temporarily moved beyond the corresponding chain shift position and thereafter returns into said chain shift position. By such go and back movement of the chain mover unit when being brought into a new chain shift position the transfer of the chain to the corresponding sprocket is to be facilitated. Such facilitating of operation is of particular interest for less skilled operators which do not use their bicycle regularly as a sporting equipment.

In view of this object the present invention consists in that a switch member is mounted on said switch frame for swinging movement about said axis. The releasable locking means are provided in part on said switch frame and in part on said switch member and define a plurality of angular switch member positions about said swinging axis with respect to said switch frame. The releasable locking means are releasable by a predetermined locking means releasing torque acting on said switch member.

Abutment means are provided in part on said operating member and in part on said switch member for defining two angularly offset terminal positions of said operating member with respect to said switch member and for transmitting a locking means releasing torque from said operating member to said switch member. The operating member is elastically biased towards a rest position with respect to said switch member by a biasing torque. The biasing torque resists against deflection of said operating member from said rest position towards at least one of said terminal positions. The biasing torque is smaller than the releasing torque. So said predetermined operating member positions are defined by respective switch member positions when said operating member is in said rest position with respect to said switch member.

In accordance with a further feature of this invention, second spring means are operationally interposed between said operating member and said switch member, said second spring means defining said rest position of said operating member between said terminal positions of said operating member, said second spring means defining a resisting torque resisting against deflection of said operating member from said rest position towards at least one of said terminal positions, said resisting torque being smaller than said releasing torque and larger than the torque transmitted by said first spring means onto said operating member. In case that this further feature of the invention is used the temporary excess movement of the chain mover unit beyond the desired chain shift position is achieved in both situations, when the chain is to be transferred from a smaller sprocket to a larger one and when the chain is to be transferred from a large sprocket to a smaller one. It is to be noted however that the excess movement is particularly desired when transferring the chain from a smaller sprocket to a larger sprocket.

When the operating member starting from an initial operating member position is swung in order to transfer the chain from an initial sprocket to another sprocket first the switch member rests in the corresponding initial switch member position and the operating member is moved from its rest position towards one of its terminal positions with respect to the switch member. Only when the operating member has been brought to this terminal position the switch member is entrained by the operating member through the abutment means. When the switch member reaches the desired position the operating member is under the action of the operator's manual force still in said terminal position with respect to the switch member. This means that the chain mover unit is in a position beyond the desired chain shift position. Only when the operator releases the operating member the operating member returns into its rest position and so the chain mover unit returns into the desired chain shift position corresponding to the selected sprocket. The amount of the excess movement of the chain mover unit is selected such that the chain is safely brought into the desired chain shift position. As comparison there is to be stated that if the chain mover unit was only moved into the desired chain shift position and not beyond this desired chain shift position the chain would not or at least not immediately move from the initially selected sprocket to the desired sprocket.

It is to be noted that the excessive movement of the chain mover unit beyond the desired chain shift position is particularly necessary when the chain is to be transferred from a smaller sprocket to a larger sprocket. Preferably however such excessive temporary movement beyond the desired chain shift position is provided in both situations, when the chain is to be transferred from a small sprocket to a larger one and when the chain is to be transferred from a large sprocket to a smaller one. Both possibilities are covered by this invention.

The various features of novelty which characterize the invention are pointed out with particularity in the claims annexed to and forming a part of this disclosure. For a better understanding of the invention its operating advantages and specific objects attained by its use, reference should be had to the accompanying drawings and descriptive matter in which there are illustrated and described preferred embodiments of the invention.

DESCRIPTION OF THE PREFERRED EMBODIMENTS

Figure 1:
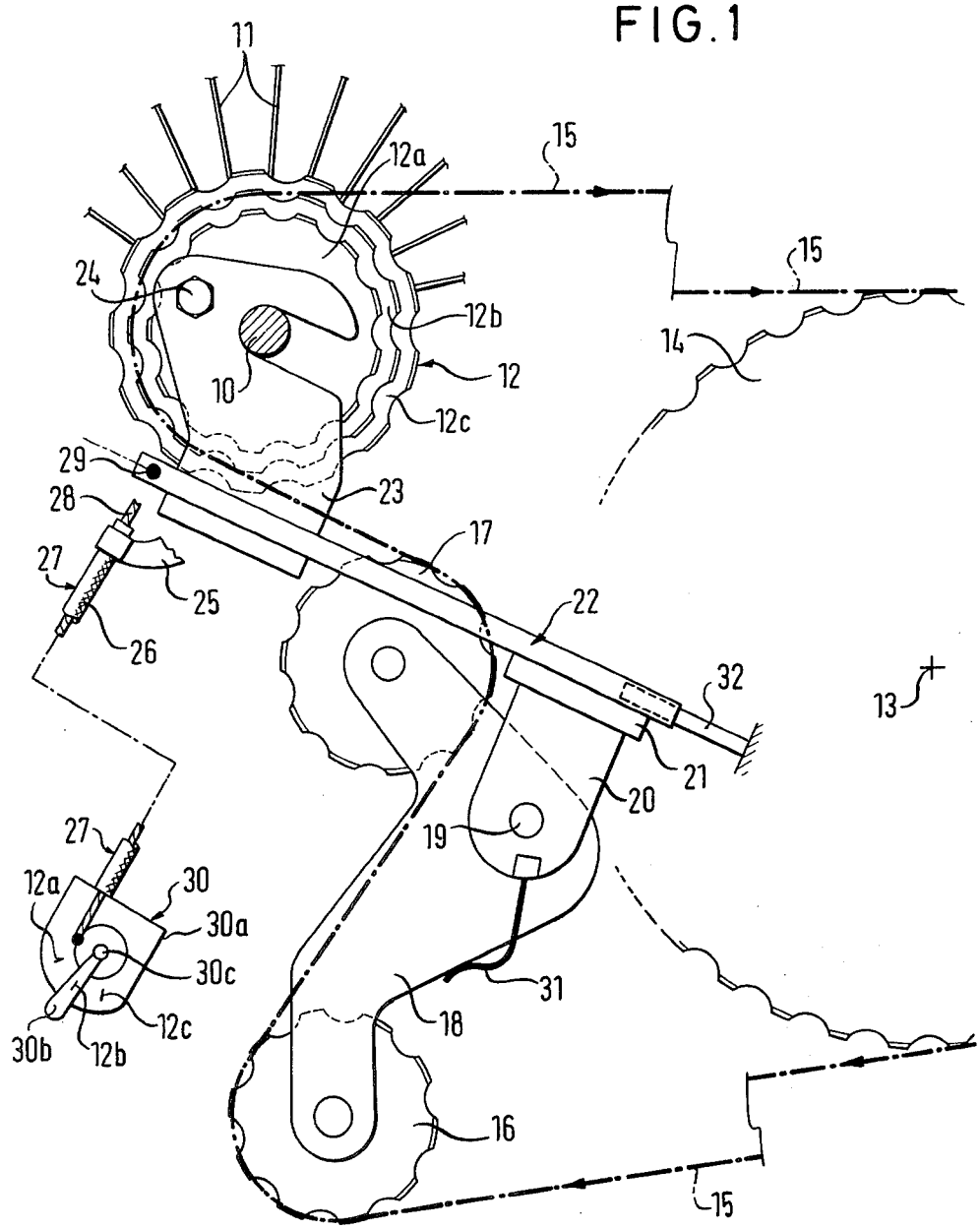
FIG. 1 is a partial side view of a bicycle, illustrating a chain-shifting device embodying the present invention.

Referring now to the drawings, wherein similar parts are identified with like reference characters throughout the various figures thereof, there is shown in FIG. 1 a derailler system in accordance with the invention which is operationally associated with the rear axle 10 of a bicycle wheel 11 represented by the spokes of the wheel. The rear wheel 11 is connected to a sprocket system 12 including a plurality of sprockets 12a–12c arranged concentrically with regard to the rear wheel and connected therewith to enable driving of the wheel at various speeds.

The system includes a conventional drive mechanism including a bicycle pedal bearing 13 upon which a drive sprocket 14 is rotatably mounted on one side of the pedal bearing.

A chain 15 extends from the sprocket 14 towards the sprockets of the sprocket system 12. The chain 15 extends over a tension pinion 16 and over an idler sprocket or wheel 17. The tension pinion 16 and the idler sprocket 17 are rotatably mounted upon a twin-arm tension lever 18 which is arranged under the influence of a tension spring 31. The tension lever 18 is mounted upon a lug 20 and rotatably connected thereto by a swiveling axle 19.

The system of the invention includes a movable support member 21 which supports the lug 20 and which is mounted upon guiding means 22 arranged to lie in a plane extending perpendicular to the plane of the drawing of FIG. 1 and movably guided in the plane perpendicular to FIG. 1. The guiding means 22 are supported by a frame-mounted chain mover support member 23 which is fastened to the rear axle 10 and which is additionally attached to the bicycle frame by means of a screw 24.

An arm 25 which is fastened to the chain mover support member 23 supports and is abutted by a sheath 26 of a Bowden wire 27 which acts upon the guiding means 22 at a point 29. The Bowden wire 27 emanates from a switch unit 30 and by means of the wire 27 the guiding means 22 may be actuated from the switch unit 30 in such a manner that the movable support member 21 will be shifted in a direction which is essentially perpendicular to the plane of the drawing in FIG. 1. As a result, the tension pinion 16 and the idler sprocket 17 will be shifted in a direction along the rear axle 10 by the movable support member 21.

Shifting of the idler sprocket 17 along the rear axle 10 will cause transfer of the chain 15 between the individual sprockets 12a–12c of the sprocket system 12. The chain 15 will always shift onto the sprocket which at any time is located essentially in a plane common with the plane of the idler sprocket 17 and extending substantially parallel with the plane of the drawing in FIG. 1.

It is to be noted that the parts 20, 19, 18, 17 and 16 can be regarded as a chain mover unit.

The switch unit 30 comprises a switch frame or housing 30a and an operating member 30b. The operating member 30b is swingable around an axis 30c. The core or wire 28 is connected to the operating member 30b. The operating member 30b can be positioned into a plurality of operating member positions 12a, 12b and 12c corresponding to the various sprockets 12a, 12b, 12c respectively. When the operating member 30b is in the operating member position 12a the chain 15 runs over the smallest sprocket 12a and the core 28 of the Bowden wire 27 is in its most released state. When the operating member 30b is in the operating member position 12c the chain 15 runs over the largest sprocket 12c and the core 28 of the Bowden wire 27 is in its most tensioned state. First spring means 32 are acting onto the guiding means 22 so as to bias the guiding means 22 into a position in which the chain 15 runs over the smallest sprocket 12a. The movement of the operating member 30b from the operating member position 12a to the operating member position 12c is made against the action of these first spring means 32.

Referring now to the embodiment of FIG. 2, there is again shown the switch frame 30a which is attached to a part of the bicycle, e.g. the steering bar. The operating member 30b is swingable around a swinging axis 30c. The core 28 of the Bowden wire 27 is attached to the operating member 30b. The action of the first spring means 32 is illustrated by an arrow.

A switch member 34 is also swingable around the swinging axis 30c. The switch member 34 can be adjusted to three different switching member positions. These switching member positions are defined on the one hand by a plurality of locking notches 36a–36c and on the other hand by a locking tooth 38, said locking tooth 38 being supported by a leaf spring 40 mounted to the switch frame 30a.

Figure 2:
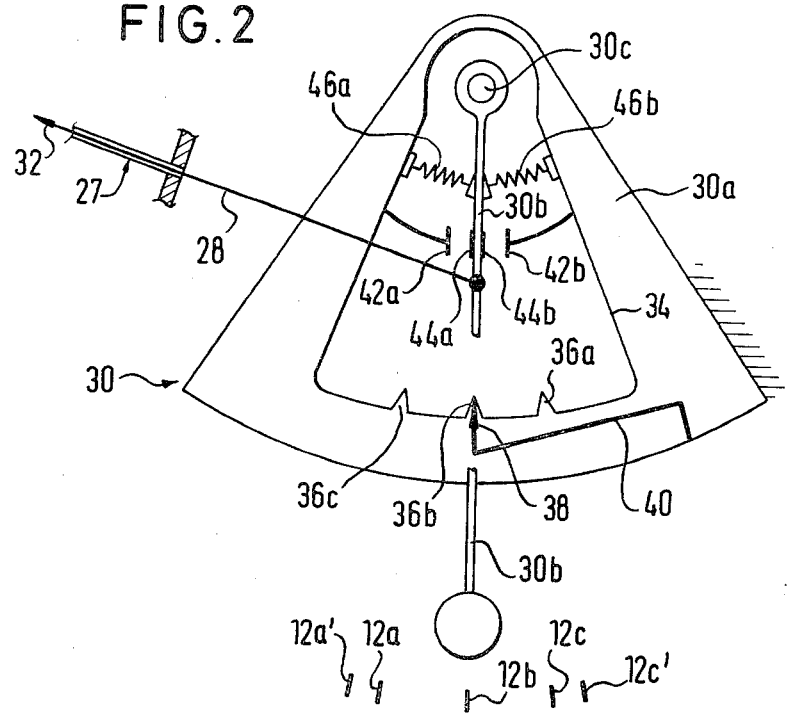
FIG. 2 is a schematic illustration of a first embodiment of the chain shift unit of this invention.

The switch member 34 is provided with first and second abutment members 42a, 42b which are opposite to abutment faces 44a, 44b of the operating member 30 respectively. First and second compression springs 46a, 46b are operationally interposed between the switch member 34 and the operating member 30b so as to define a rest position of the operating member 30b with respect to the switch member 34 as shown in FIG. 2. Both compression springs 46a, 46b may be prestressed.

The position of the switch unit as shown in FIG. 2 corresponds to the position of FIG. 1, the idler sprocket 17 being in a common plane with the sprocket 12b and the chain 15 running over the sprocket 12b.

When it is intended to transfer the chain 15 from the sprocket 12b to the sprocket 12c the operating member 30b is swung counterclockwise. The compression spring 46b is compressed until the abutment face 44b engages the abutment member 42b. When the operating member 30b is further moved counterclockwise the switch member 34 is entrained by the abutment face 44b and the abutment member 42b engaging each other and the locking tooth 38 leaves the notch 36b and finally enters into the notch 36c. When the locking tooth 38 enters into the locking notch 36c the operating member 30b is in a position 12c', i.e. is beyond the position 12c which is defined by the switch member 34 being in the switch position 36c and the operating member 30b being in the rest position with respect to the switch member 34. As a result thereof, the core 28 of the Bowden wire 27 and the chain mover unit have been moved to a position beyond the position corresponding to the sprocket 12c. This excessive movement makes sure that the chain 15 is transferred onto the larger sprocket 12c. Only when the operator releases the operating member 30b this operating member 30b returns from the position 12c' to the position 12c corresponding to the rest position of the operating member 30b with respect to the switch member 34. So the chain mover unit returns to the chain shift position corresponding to the sprocket 12c in which the idler sprocket 17 is in a position substantially coplanar with the sprocket 12c. It is to be noted that the compression spring 46a exerts a torque onto the operating member 30b, which is greater than the torque exerted by the first spring means onto the operating member 30b so that the operating member 30b remains in the rest position as shown in FIG. 2, in spite of the torque exerted onto the operating member 30b by the first spring means 32. It is to be noted further that the torque exerted onto the operating member 30b by the compression spring 46b must be smaller than the releasing torque to be exerted onto the switch member 34 for expelling the locking tooth 38 from the locking notch 36b so that the switch member 34 begins to move in clockwise direction only when the abutment face 44b has engaged the abutment member 42b.

When the chain is to be transferred from the sprocket 12b to the sprocket 12a the operating member 30b is moved in clockwise direction so that in a first stage the compression spring 46a is compressed without the switch member 34 being moved, and that in a second stage when the abutment face 44a has engaged the abutment member 42a the switch member 34 is also moved in clockwise direction, the locking tooth 38 escaping from the locking notch 36b and finally entering into the locking notch 36a. It is to be noted that the operating member 30b is positioned at 12a' when the locking tooth 38 enters into the locking notch 36a. This means that the core 28 of the Bowden wire 27 and the chain mover unit temporarily move beyond the position which corresponds to the sprocket 12a so that the chain is safely transferred onto the sprocket 12a. Only when the operator releases the operating member 30b the operating member 30b is returned by the compression spring 46a into its rest position, i.e. in the position 12a. It is to be noted that the torque exerted onto the operating member 30b by the compression spring 46a must be smaller than the releasing torque to be exerted onto the switch member 34 for expelling the locking tooth 38 from the locking notch 36b.

Figure 3:
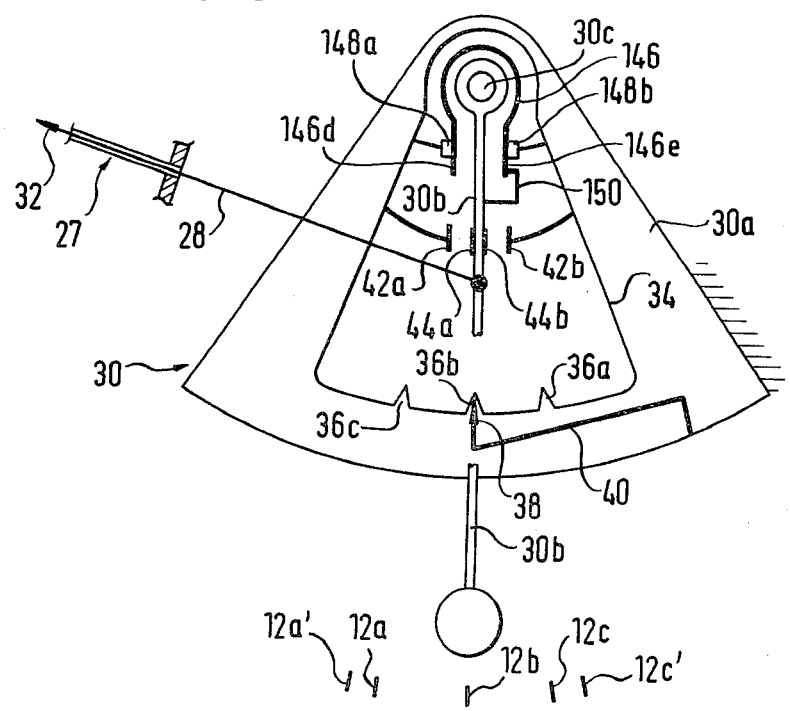
FIG. 3 is a schematic illustration of a second embodiment of the chain shift unit.

The embodiment of FIG. 3 is similar to the embodiment of FIG. 2 with the following differences: A torsional spring 146 surrounds the swinging axis 30c and comprises two terminal legs 146d, 146e. The terminal legs 146d, 146e are prestressed between two prestressing members 148a, 148b, said prestressing members being fixed to the switch member 34. A spring engagement member 150 is fixed to the operating member 30b and engages the terminal leg 146e.

The operating member 30b is maintained in its rest position with respect to the switch member 34 by the torsional spring 146 on the one hand and the first spring means 32 acting onto the core 28 on the other hand.

FIG. 3 shows again the state of the switch unit, which corresponds to FIG. 1. When the operating member 30b is swung in counterclockwise direction this is effected against the action of the first spring means 32, the switch member remaining first unchanged in the position of FIG. 3. Only when the abutment face 44b engages the abutment member 42b the switch member 34 is entrained by the operating member 30b until the locking tooth 38 enters into the locking notch 36c. The chain mover unit is subject to the same temporary movement beyond the chain shift position corresponding to the sprocket 12c as described in connection with FIG. 2 and returns to the chain shift position only when the operator releases the operating member 30b.

When the operating member 30b is moved in clockwise direction for transferring the chain from the sprocket 12b to the sprocket 12a in a first stage the terminal leg 146e is approached towards the terminal leg 146d by the spring engagement member 150 until the abutment face 44a engages the abutment member 42a. Hereupon the switch member 34 is entrained in clockwise direction by the operating member 30b. Again a temporary excessive movement of the chain mover unit is achieved beyond the chain shift position corresponding to the sprocket 12a.

It is to be noted that the torque exerted onto the operating member 30b by the first spring means 32 must be smaller than the torque of the torsional spring 146 resisting to the clockwise movement of the operating member 30b from its rest position as shown in FIG. 3 to the terminal position defined by engagement of the abutment face 44a and the abutment member 42a.

It is to be noted that the locking means as illustrated by locking notches 35a–36c and a locking tooth 38 can be replaced by other known forms of torque-releasable locking means.

Figure 4:
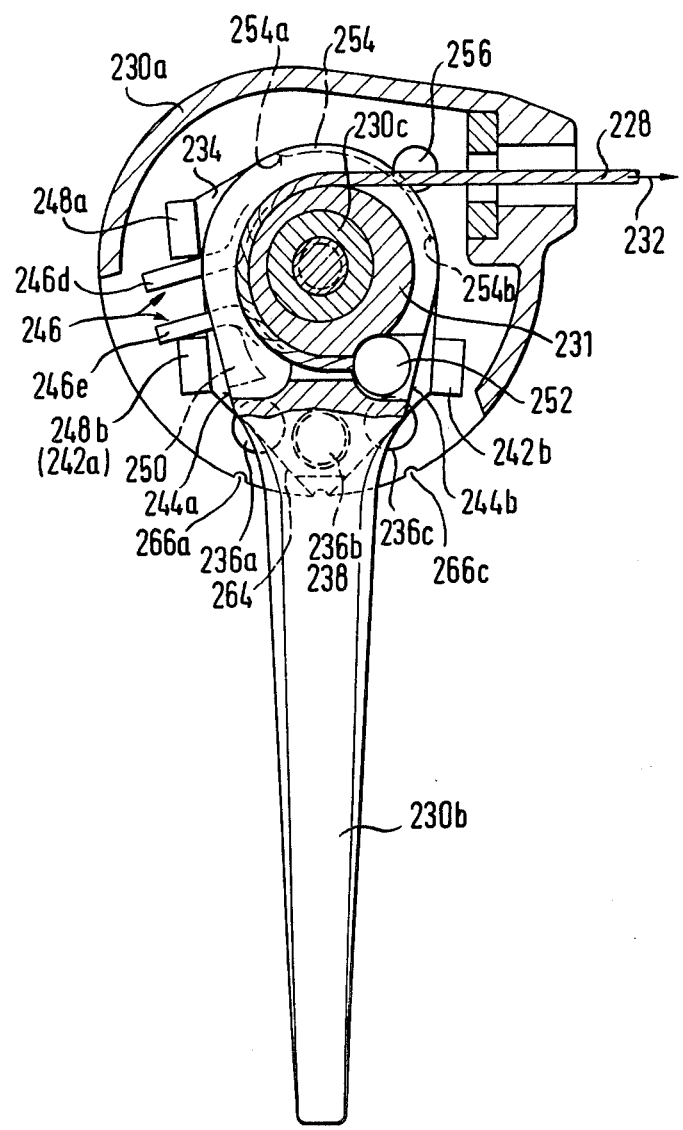
FIG. 4 is a constructive embodiment of this invention corresponding to the design principles of FIG. 3, partly in section according to line IV—IV of FIG. 5.
Figure 5:
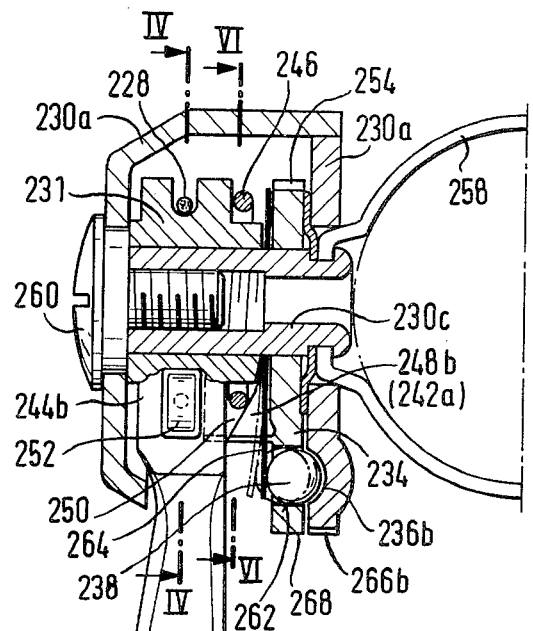
FIG. 5 is a section of the switch unit of FIG. 4 in a section containing the swinging axis.
Figure 6:
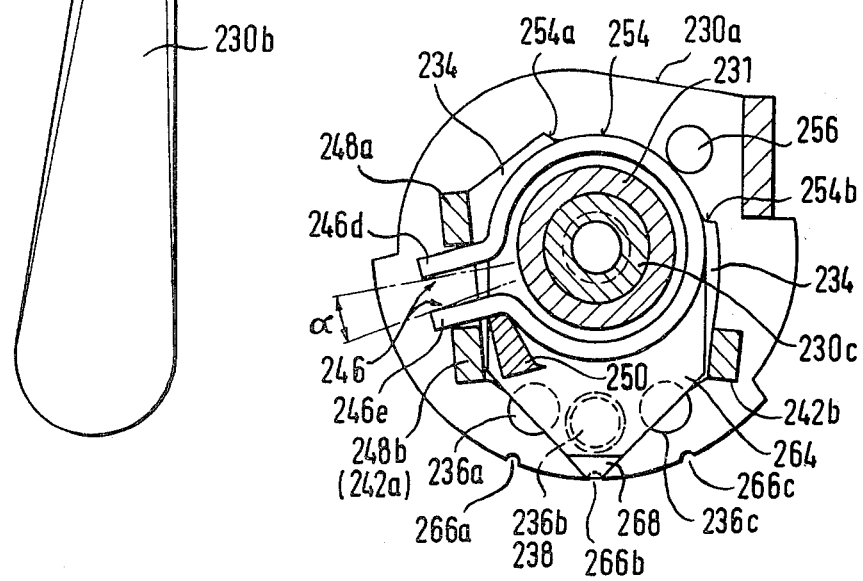
FIG. 6 is a section according to line VI—VI of FIG. 5.

In the embodiment of FIGS. 4 to 6 analogous parts are designated by the same reference numerals as in FIGS. 2 and 3, however increased by 100 and 200 respectively.

In this embodiment the restressing member 248b fulfills also the function of the abutment member 242a. The swinging axis is defined by a hollow axle 230c which is fixed to a clamping ring 258 (see FIG. 5). The core 228 of the Bowden wire is wound around a hub member 231 integral with the operating member 230b. The core 228 is fixed to the hub 231 by a pellet 252. The switch member 234 is provided with a circumferential groove 254 extending over an angle corresponding to the total range of movement of the switch member 234. This circumferential groove provides terminal flanks 254a, 254b. These flanks are engaged by a stop member 256 when the switch member approaches the terminal ends of its path of movement. The stop member 256 is fixed to the frame 230a. The frame 230a is fixed onto the hollow axle 230c by a bolt member 260. The switch member 234 and the hub 231 are both rotatably mounted to the hollow axle 230c.

The locking means are shown in FIG. 5. They comprise a locking ball 238. This locking ball 238 is housed in a bore 262 of the switch member 234, which bore defines a cage. The locking ball 238 is to engage a plurality of dimples 236a–236c provided in the base wall of the frame 230a. The locking ball 238 is subject to the force of a membrane-shaped spring 264 interposed between the switch member 234 and the hub member 231.

Both FIGS. 4 and 6 show the state in which the operating member 230b is in its rest position.

FIG. 6 shows indicating means for indicating the position of the switch member 234 with respect to the frame 230a. These indicating means comprise recesses 266a–266c and an indicator 268 which is integral with the switch member 234.

The operation of the device as shown in FIGS. 4, 5 and 6 is identic with the operation of the switch unit as shown in FIG. 3.

It will be readily understandable that instead of three switch member positions more or less switch member positions, e.g. 5 switch member positions may be provided.

In FIG. 5, an angle α is shown which corresponds to the movement of the operating member 30b as shown in FIG. 3 to the position defined by the abutment face 44a and the abutment member 42a.

It is readily to be understood that in the switch unit as shown e.g. in FIG. 3 the abutment member could be in engagement with the abutment face 44a even in the rest position as shown. In this case a temporary movement of the chain mover unit beyond the desired shift position would only occur when the operating member is moved in counterclockwise direction, i.e. when the chain is to be transferred from a smaller sprocket to a larger one.

While specific embodiments of the invention have been shown and described in detail to illustrate the application of the inventive principles, it will be understood that the invention may be embodied otherwise without departing from such principles.

The reference numerals are only for an easier understanding. They are not to be understood in a restrictive sense.

What is claimed is:

1. In a chain-shifting device for a bicycle or the like comprising a switch unit (30), said switch unit (30) including a switch frame (30a) to be attached to a part of the bicycle, an operating member (30b) swingingly mounted on said switch frame (30a) about a swinging axis (30c), said operating member (30b) being adjustable into a plurality of predetermined angular operating member positions (12a–12c) about said swinging axis (30c) with respect to said switch frame (30a), said operating member positions (12a–12c) being defined by releasable locking means;

a chain mover support member (23) to be attached to the bicycle frame;

a chain mover unit (16–21) mounted on said chain mover support member (23) by guiding means (22) guiding said chain mover unit (16–21) along a path of movement with respect to said chain mover support member (23);

first spring means (32) biasing said chain mover unit (16–21) towards one end of said path of movement;

transmission means (27) extending between said operating member (30b) and said chain mover unit (16–21), said transmission means (27) including a pulling member (28), said chain mover unit (16–21) being movable by said operating member (30b) via said transmission means (27) and against the action of said first spring means (32) into a plurality of chain shift positions corresponding to said plurality of operating member positions (12a–12c), the improvement which comprises that (a) a switch member (34) is mounted on said switch frame (30a) for swinging movement about said axis (30c);

(b) said releasable locking means (38; 36a–36c) are provided in part on said switch frame (30a) and in part on said switch member (34) and defining a plurality of angular switch member positions (36a–36c) about said swinging axis (30c) with respect to said switch frame (30a), said releasable locking means (38; 36a–36c) being releasable by a predetermined locking means releasing torque acting onto said switch member (34);

(c) abutment means (44a, 44b; 42a, 42b) are provided in part on said operating member (30b) and in part on said switch member (34) for defining two angularly offset terminal positions of said operating member (30b) with respect to said switch member (34) and for transmitting a locking means releasing torque from said operating member (30b) to said switch member (34);

(d) said operating member (30b) is elastically biased towards a rest position with respect to said switch member (34) by a biasing torque, said biasing torque resisting against deflection of said operating member (30b) from said rest position towards at least one of said terminal positions, said biasing torque being smaller than said releasing torque;

(e) said predetermined operating member positions are defined by respective switch member positions (36a–36c) when said operating member (30b) is in said rest position with respect to said switch member (34).

2. A chain-shifting device as set forth in claim 1, wherein second sring means (46a, 46b) are operationally interposed between said operating member (30b) and said switch member (34), said second spring means (46a, 46b) defining said rest position of said operating member (30b) between said terminal positions of said operating member (30b), said second spring means (46a, 46b) defining a resisting torque resisting against deflection of said operating member (30b) from said rest position towards at least one of said terminal positions, said resisting torque being smaller than said releasing torque and larger than the torque transmitted by said first spring means (32) onto said operating member (30b).

3. A chain-shifting device as set forth in claim 2, wherein said second spring means (146) comprise a spring element (146) supporting said operating member (30b) in said rest position against the action of said first spring means (32), the resisting torque of said spring element (146) being smaller than said locking means releasing torque and larger than the torque transmitted by said first spring means (32) onto said operating member (30b).

4. A chain-shifting device as set forth in claim 2, wherein said second spring means (146) are prestressed even in said rest position of said operating member (30b).

5. A chain-shifting device as set forth in claim 2, wherein said releasable locking means comprise a locking ball (238) housed in a cage (262) provided on one of said switch frame (230a) and said switch member (234), a plurality of ball receiving dimples (236a–236c) being provided on the other one of said switch frame (230a)

and said switch member (234), and third spring means (264) urging said locking ball (238) into releasable engagement with a respective one of said dimples (236a–236c).

6. A chain-shifting device as set forth in claim 2, wherein said second spring means comprise a torsional spring (246) surrounding said swinging axis (230c) and having two substantially radially directed terminal legs (246d, 246e), said terminal legs (246d, 246e) being positioned under prestress between two prestressing members (248a, 248b) fixed to said switch member (234).

7. A chain-shifting device as set forth in claim 2, wherein the total angular swinging range of said switch member (234) with respect to said switch frame (230a) is limited by swinging range limiting means (256; 254a, 254b) provided in part on said switch frame (230a) and in part on said switch member (234).

8. A chain-shifting device as set forth in claim 2, wherein indicating means (268; 266a–266c) for indicating the respective switch member position are provided in part on said switch frame (230a) and in part on said switch member (234).

9. A chain-shifting device as set forth in claim 2, wherein said abutment means include said second spring means (46a, 46b), the resisting torque of said second spring means (46a, 46b) being increased up to said locking means releasing torque on deflection of said operating member (30b) from said rest position towards said at least one terminal position.

* * * * *